March 13, 1956  A. W. HUSSMANN  2,738,123
PRESSURE EXCHANGER WITH COMBINED STATIC
AND DYNAMIC PRESSURE EXCHANGE
Filed Oct. 25, 1949  4 Sheets-Sheet 2
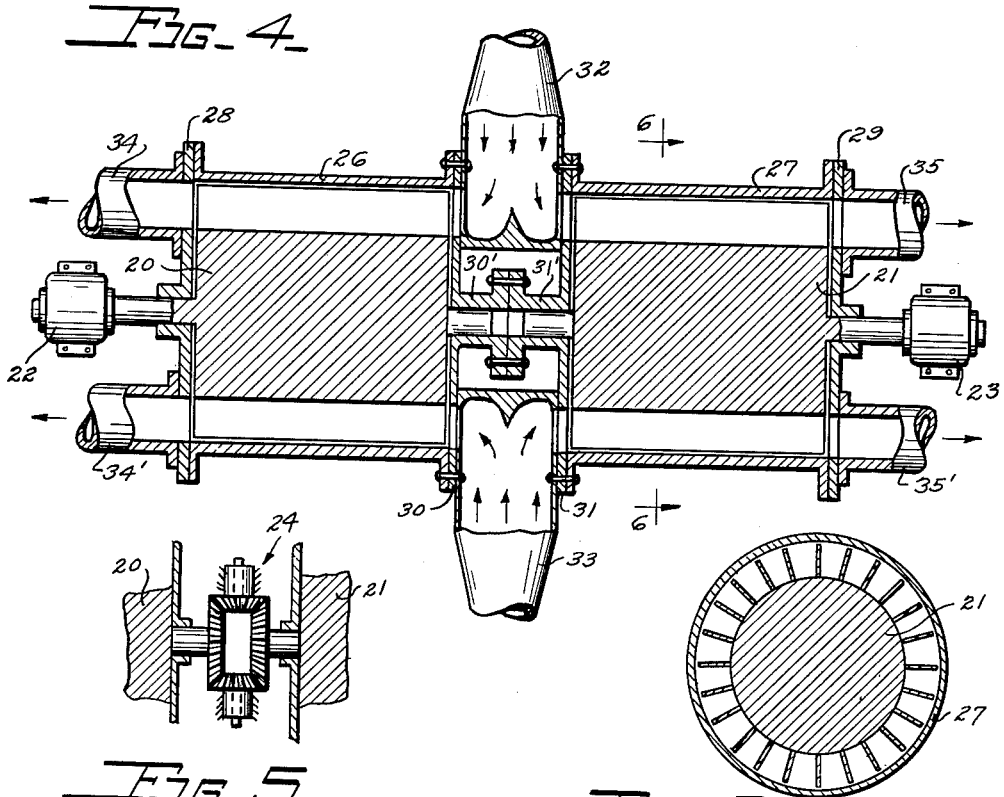
Fig. 4.
Fig. 5.
Fig. 6.
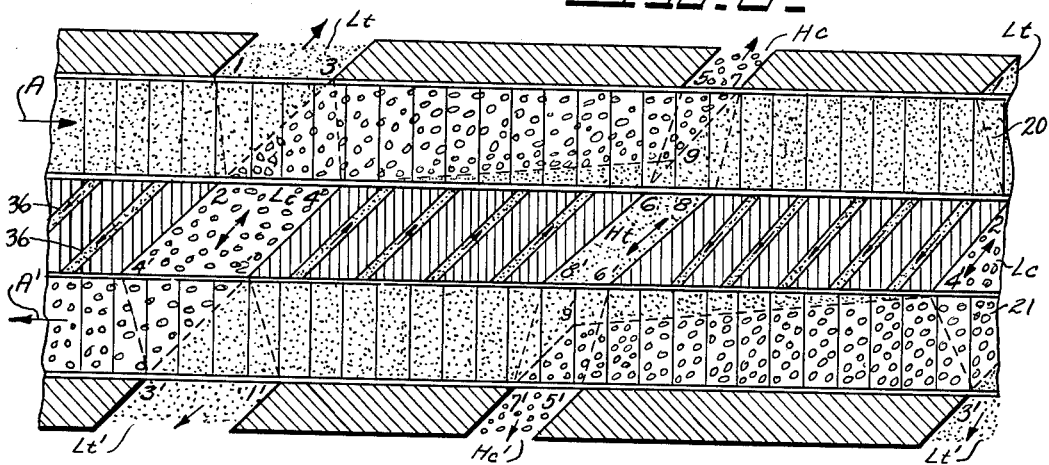
Fig. 7.
INVENTOR.
ALBRECHT WILHELM HUSSMANN
BY Wade Koontz
ATTORNEY
Charles L. Burgoyne
AGENT March 13, 1956
A. W. HUSSMANN
2,738,123
PRESSURE EXCHANGER WITH COMBINED STATIC
AND DYNAMIC PRESSURE EXCHANGE
Filed Oct. 25, 1949
4 Sheets-Sheet 3
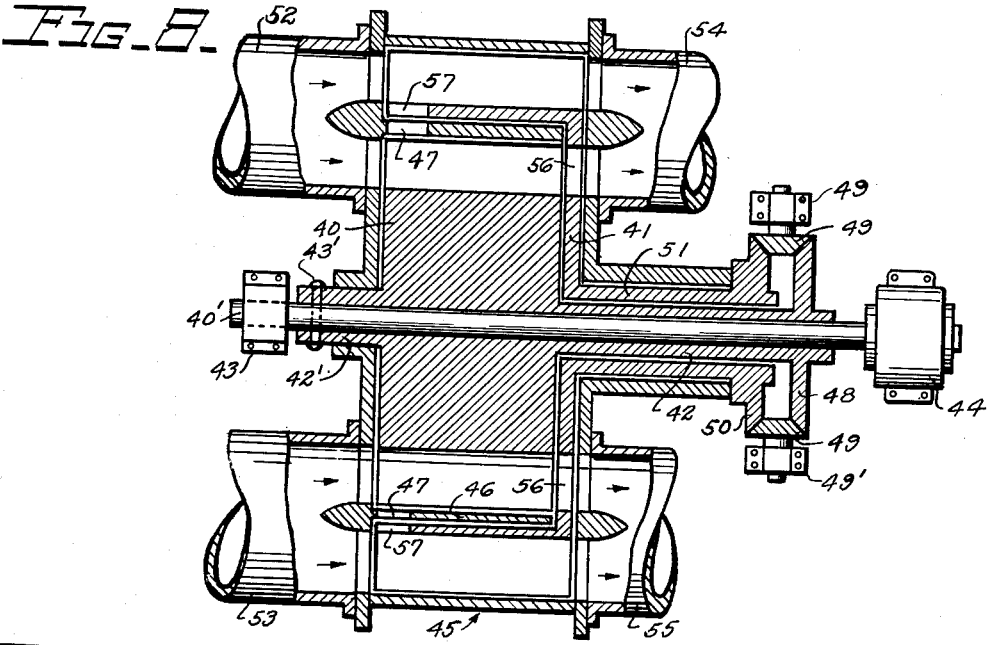
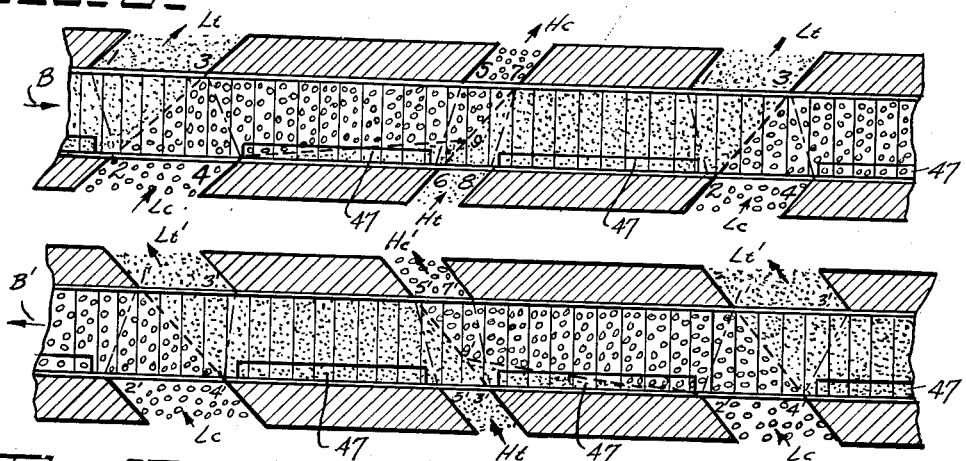
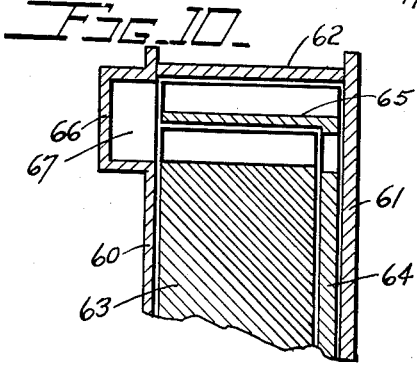
INVENTOR.
ALBRECHT WILHELM HUSSMANN
BY Wade Krontz AND
ATTORNEY
Charles L. Burgoyne
AGENT INVENTOR.
ALBRECHT WILHELM HUSSMANN
BY Wade Koontz AND
Charles L. Burgoyne
ATTORNEY
—AGENT

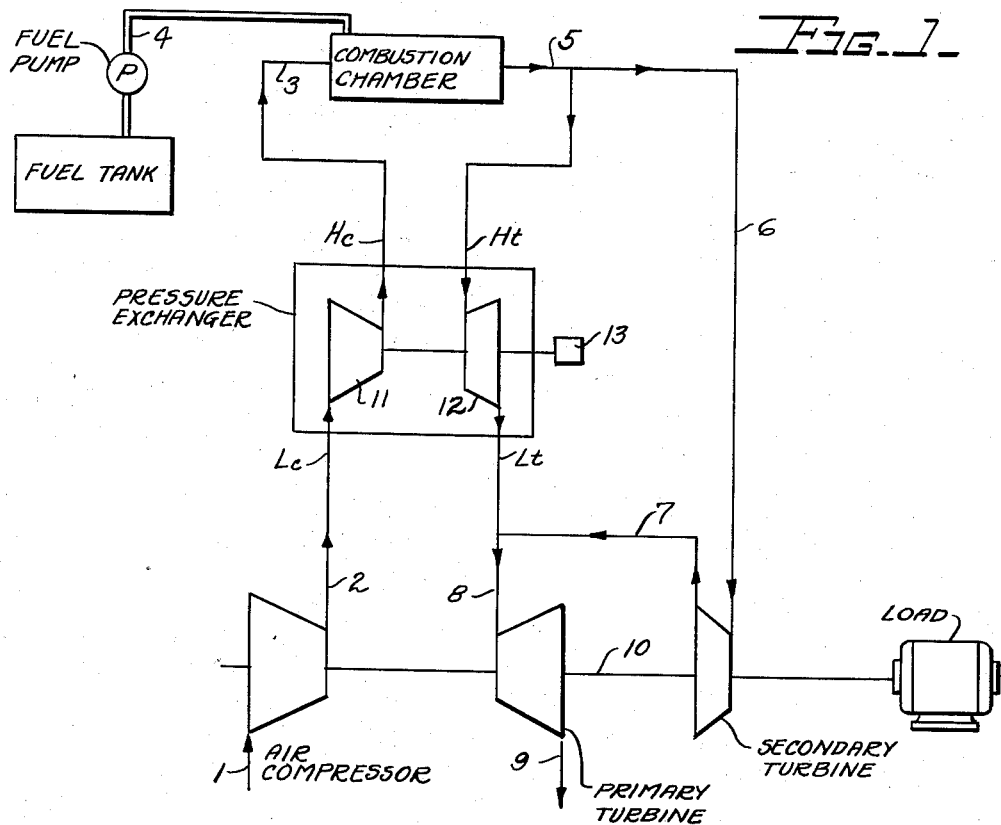
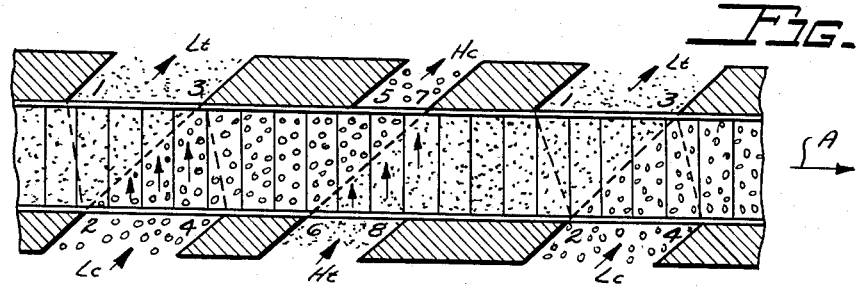
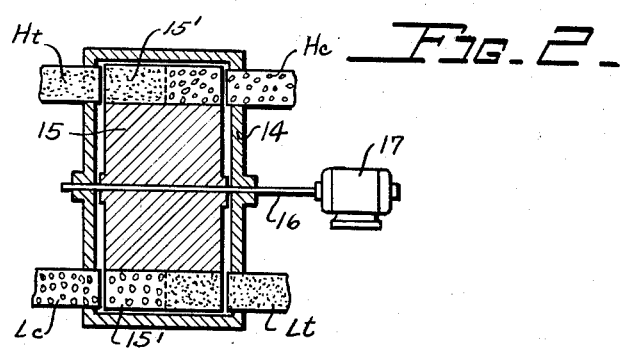

United States Patent Office

2,738,123
Patented Mar. 13, 1956

2,738,123

PRESSURE EXCHANGER WITH COMBINED STATIC AND DYNAMIC PRESSURE EXCHANGE

Albrecht W. Hussmann, Raleigh, N. C., assignor to the United States of America as represented by the Secretary of War Application October 25, 1949, Serial No. 123,495

4 Claims. (Cl. 230—69)

(Granted under Title 35, U. S. Code (1952), sec. 266)

The invention described herein may be manufactured and used by or for the United States Government for governmental purposes without payment to me of any royalty thereon.

The present invention relates to an improved pressure exchanger characterized by an arrangement for producing both dynamic pressure exchange and gradual static pressure exchange.

The primary object of the invention is to provide a pressure exchanger of general utility in power cycles and gas turbine power plants capable of accomplishing a more efficient production of power by virtue of higher pressure ratios and greater operating flexibility.

A further object of the invention is to provide an improved pressure exchanger including at least one multi-cell rotor within a casing, low pressure and high pressure gas inlets on one side of the casing, low pressure and high pressure gas outlets on the other side of the casing to accomplish a dynamic pressure exchange in cells moving past said inlets and outlets, and conduit means making connection between separate cells intermediate between inlets and outlets to accomplish a gradual static pressure exchange between cells carrying gas at a higher pressure and cells carrying gas at a lower pressure.

Another object of the invention is to provide an improved pressure exchanger including at least one multi-cell rotor within a casing, low pressure and high pressure gas inlets on one side of the casing, low pressure and high pressure gas outlets on the other side of the casing with similar pressure passages substantially opposite to each other, and means to produce a gradual static pressure increase in cells moving from the low pressure gas inlet and outlet toward the high pressure gas inlet and outlet.

Another object of the invention is to provide an improved pressure exchanger including at least one multi-cell rotor within a casing, means to rotate the rotor, low pressure and high pressure gas inlets on one side of the casing, low pressure and high pressure gas outlets on the other side of the casing with similar pressure passages substantially opposite to each other, and conduit means extending between cells moving from the high pressure inlet and outlet toward the low pressure inlet and outlet and other cells moving from the low pressure inlet and outlet toward the high pressure inlet and outlet to effect a gradual static pressure exchange between cells carrying gas at a higher pressure and cells carrying gas at a lower pressure.

Another object of the invention is to provide an improved pressure exchanger having more than one multi-cell rotor with the rotors so correlated and interconnected by gas passages as to permit both a dynamic pressure exchange and a gradual static pressure exchange.

Another object of the invention is to provide a two-rotor pressure exchanger including means to rotate the rotors in opposite directions, low pressure and high pressure gas inlets at one side of each rotor, low pressure and high pressure gas outlets at the other side of each rotor with similar pressure passages substantially opposite to each other, and conduit means extending between cells of one rotor moving from the high pressure inlet and outlet toward the low pressure inlet and outlet and cells of the other rotor moving from the low pressure inlet and outlet toward the high pressure inlet and outlet to effect a gradual static pressure exchange between cells carrying gas at a higher pressure and cells carrying gas at a lower pressure.

The above and other objects of the invention will become apparent upon reading the following detailed description in conjunction with the accompanying drawings, in which:

Fig. 1 is a diagrammatic view of a power plant including a pressure exchanger to show one possible application of the invention.

Fig. 2 is a schematic cross sectional view of a simple form of pressure exchanger.

Fig. 3 is a diagrammatic developed plan view of the pressure exchanger of Fig. 2, which embodies only a dynamic pressure exchange.

Fig. 4 is a cross sectional view of one form of the invention for accomplishing both a dynamic pressure exchange and a gradual static pressure exchange.

Fig. 5 illustrates a modified construction for use in the apparatus of Fig. 4.

Fig. 6 is a transverse cross section taken on line 6—6 of Fig. 4.

Fig. 7 is a diagrammatic developed plan view to show the pressure exchange functions of the apparatus of Fig. 4.

Fig. 8 is a cross sectional view of a two-rotor pressure exchanger similar to that of Fig. 4 but with one rotor inside the other.

Fig. 9 is a diagrammatic developed plan view to show the pressure exchange functions of the apparatus of Fig. 8.

Fig. 10 is a fragmentary cross sectional view of a modified construction for use in the apparatus of Fig. 8.

Figure 11:
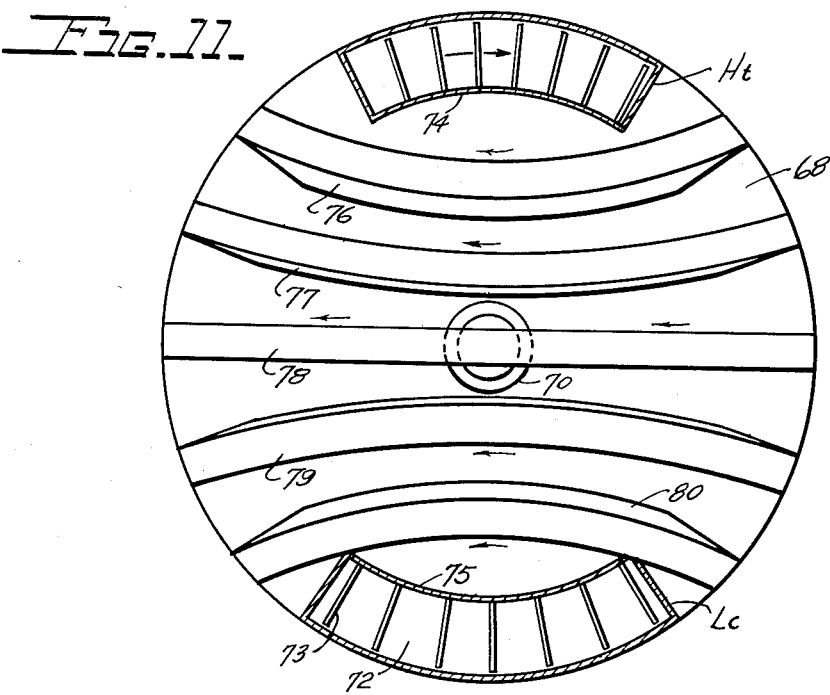
Fig. 11 is an end view of a single rotor pressure exchanger capable of accomplishing both dynamic and gradual static pressure exchange.

The pressure exchanger is a well-known type of power plant auxiliary and is especially adapted for use in power plants employing gas turbines as prime movers. By the addition of a pressure exchanger unit to such a power plant the overall efficiency can be increased very substantially. One prior disclosure of the pressure exchanger may be found in U. S. Patent No. 2,399,394 granted to Claude Seippel on April 30, 1946, and a later disclosure of a special power plant making use of a pressure exchanger may be found in U. S. Patent No. 2,461,186 granted to Claude Seippel on February 8, 1949. The possibilities for combining the pressure exchanger with various power plant units are many and varied, but by way of example one power plant or system is shown in Fig. 1 of the drawings. The main units as indicated therein are the air compressor, the fuel tank, the fuel pump, the combustion chamber, the pressure exchanger, the primary turbine, the secondary turbine and the power load which is a generator or dynamo in the example shown. The pressure exchanger is merely represented by a compressor 11 driven by a turbine 12 for the reason that if two such units were used in the system they would provide the closest known equivalent of a pressure exchanger. Thus the connected compressor and turbine 11 and 12 have been accepted as a functional representation of a pressure exchanger. This functional analogy is also carried through the theory and terminology of pressure exchangers, especially by reference to the compressor cycle and the turbine cycle of the pressure exchanger. Starting with the air compressor receiving atmospheric air at 14.7 pounds per square inch, the incoming air enters at 1 and leaves at 2 having been boosted to a pressure of 50 pounds for example. The compressed air now enters the low pressure side of the compressor cycle ($L_c$) of the pressure exchanger. The high pressure side of the compressor cycle ($H_c$) connects at 3 with the combustion chamber, while the latter receives a steady supply of fuel by a conduit 4 from a fuel tank and fuel pump. The pressure boost through the compression cycle of the pressure exchanger may for example bring the air entering the combustion chamber up to about 150 pounds. The heated air leaving the combustion chamber has greatly expanded in volume over the volume of high pressure air which entered the combustion chamber and this heated air leaving at 5 supplies the secondary turbine by way of conduit 6 and also the high pressure side of the turbine cycle ($H_t$) of the pressure exchanger. The pressure of the air and combustion products reaching both of these units may be around 150 pounds for example. The exhaust from the secondary turbine flows in the conduit 7 and is combined with the outlet flow from the low pressure side of the turbine cycle ($L_t$) of the pressure exchanger, both at a pressure of 50 pounds for example. This combined gas flow now reaches the inlet of the primary turbine by way of the conduit 8. The exhaust from the primary turbine flows by way of a conduit 9 to any suitable unit or apparatus capable of utilizing the heat remaining in the exhaust gases. This exhaust pressure would of course be close to atmospheric pressure, that is, 14.7 pounds. As indicated at 10 a shaft connects the air compressor, primary turbine, secondary turbine, and the power load. Other arrangements may be effected if desired, for instance the secondary turbine may be used to drive the air compressor and some additional load, while the primary turbine may be used to drive the principal power load thus permitting different shaft speeds for the two turbines and the units driven thereby. This may be advantageous in securing closer speed regulation for the principal power load. As will appear in the subsequent description of the pressure exchanger, there is some power required to rotate the pressure exchanger but this is taken care of by a small electric motor or other auxiliary unit. It might be noted that the principal reason for the success of the pressure exchanger is that it does provide the equivalent of a coupled compressor and turbine but does so with less complicated machinery, at less cost and with less space requirement. Also the maintenance problems are far less significant with the pressure exchanger.

The symbolic representation of the pressure exchanger Fig. 1 may be noted now in particular. The compressor 11 and coupled turbine 12 are shown as though they are driven by a motor 13, but it is understood that the compressor and turbine are merely shown because of their theoretical equivalency to a pressure exchanger. It should be remembered that the cold gases flowing through the compressor cycle from $L_c$ to $H_c$ are being compressed, while the hot gases flowing through the turbine cycle from $H_t$ to $L_t$ are being expanded. Thus the turbine cycle may also be termed the expansion cycle. One characteristic of the pressure exchanger is that the gas volumes of the compressor cycle and the turbine cycle must be equal, because they are handled in the same rotor cells making up the pressure exchanger rotor or rotors. This fact explains why it is necessary to provide a bypass flow around the turbine or expansion cycle, as at 6 in the power plant of Fig. 1. A simple form of pressure exchanger is shown in longitudinal cross section in Fig. 2, wherein there is a cylindrical housing 14 having a rotor 15 mounted to spin therein on the shaft 16 connected to the driving motor 17. On the outer periphery of the rotor 15 there are numerous axially disposed cells 15' open at both ends so as to connect in successive manner to the conduits $L_c$, $L_t$, $H_t$ and $H_c$. The air in conduit $L_c$ and also that filling about one-half of one cell 15' represents air to be compressed, while the air in conduit $H_c$ and also filling about one-half of another cell 15' represents air which has been compressed. Similarly the air or combustion products in conduit $H_c$ represents gas to be expanded, while the gas in conduit $L_t$ represents gas which has been expanded.

Briefly the process accomplished in the pressure exchanger of Fig. 2 takes advantage of dynamic exchange by means of shock waves, whereby air trapped suddenly in a cell is compressed by a ram effect induced by the flow of low pressure air and other gas is later compressed by the action of a second shock wave set up in connecting a cell with a source of high pressure gas. This alternate trapping and compressing of air takes place in the lower and upper cells or channels 15' respectively, in the apparatus shown in Fig. 2. The low pressure air flows in a selected cell at $L_c$, while the same air after compression flows out of the cell at $H_c$. The first compression is accomplished by suddenly stopping the air moving along the conduit $L_c$, since the cell receiving a charge of air immediately moves to a position where there is no outlet connected thereto. The second compressive shock wave set up by suddenly connecting the cell to the conduit $H_t$ not only causes additional compression of the air previously trapped in the cell but also forces the high pressure gas into the conduit $H_c$. This may be considered an expansion wave, the action of which is duplicated when the cell again becomes connected to the conduit $L_t$. Here as the air flows into the cell from the conduit $L_c$ the gas which was trapped in the cell when it was connected to the conduit $H_t$ will flow out by expansion into the conduit $L_t$. It must be noted too that the rotor 15 is turning on its axis at a rapid rate of speed, so that the successive steps of the process as applied to a selected rotor cell occur with very little time lag. While the rotative speed may vary within reasonable limits even for the same unit, a round figure for the linear speed of the cells may be stated by way of example as 400 feet per second. The difference in temperature of the incoming air or gas at conduits $L_c$ and $H_t$ causes the cell structure to reach only a mean temperature, since the air or gas is in the cells for only a brief interval of time. Furthermore the whole rotor structure becomes uniformly heated soon after operation begins and there will be no appreciable heating and cooling of the cell walls at various points on the cycle of operation. For a more detailed description of the operation of the basic dynamic pressure exchanger, reference may be had to the Seippel Patent No. 2,399,394 cited above.

For a description of the preferred embodiment of the present pressure exchanger which provides for both static and dynamic pressure exchange, reference is now made to Fig. 4 wherein there is illustrated a two-rotor pressure exchanger with counter-rotating rotors 20 and 21 of identical size and construction. The rotor 20 is directly connected to a motor 22 and the rotor 21 is directly connected to a motor 23. The motors are of the synchronous type and are supplied from the same source of alternating current so as to run at exactly the same speed but in opposite directions of rotation. As an alternative arrangement a motor may be directly connected to one rotor only and the other rotor may be driven in unison with the first rotor by the use of a set of bevel gears as indicated at 24 in Fig. 5. Thus this alternative construction will positively maintain the same rotor speed for the counter-rotating rotors and may even be employed where separate motors are provided, as in Fig. 4, to ensure perfect synchronization of the rotors. Each of the rotors 20 and 21 carry individual cells or channels arranged around the periphery thereof, as shown best in Fig. 6. It is understood that these cells are open at each end to permit gas flow therethrough when the cells coincide with the inlet and outlet conduits. The rotor 20 is surrounded by a cylindrical casing member 26, while the rotor 21 is surrounded by a similar casing member 27. The remote ends of these members 26 and 27 are closed by end plates 28 and 29 respectively. The adjacent ends of the casing members are closed by additional end plates 30 and 31 which are provided with central bearing bosses 30' and 31' secured together as shown. Between the end plates 30 and 31 are a pair of opposite gas inlet conduits 32 and 33. These conduits are provided with side openings coinciding with other openings in the casing end plates and these openings are of such size and shape as to open into more than one rotor cell at a time, as will be explained with reference to Fig. 7. Fixed to the casing end plates 28 and 29 are pairs of gas outlet conduits 34, 34' and 35, 35'. Between the adjacent casing end plates 30 and 31 there are static pressure exchange conduits or passages, which merely extend between the adjacent ends of the rotor cells. While these passages do not show in Fig. 4 they are shown in Fig. 7, wherein the rotor cells and various conduits are shown in a developed diagrammatic plan view.

Before considering Fig. 7 of the operation of the basic dynamic pressure exchanger of Fig. 2 will be explained by reference to Fig. 3, which shows in developed plan the cells of rotor 15 and the various conduits $L_c$, $L_t$, $H_t$ and $H_c$. There is a duplication of conduits $L_c$ and $L_t$ so that the operation may be explained with reference to more than one complete revolution of the rotor. The cells are of course assumed to be moving in the direction of the arrow A. The letter L indicates low pressure, H indicates high pressure and the subscripts $c$ and $t$ indicate the compressor cycle and the turbine cycle respectively. The low pressure air flowing in at $L_c$ is at a lower temperature than the high pressure gas flowing in at $H_t$, since by reference to the power plant diagram (Fig. 1) it may be observed that the low pressure air supply is merely derived from the air compressor while the high pressure gas supply is derived from the combustion chamber. The low pressure gas or air which is to be compressed further flows into the pressure exchanger at $L_c$ displacing the expanded hot gases which are simultaneously flowing out of the pressure exchanger at $L_t$. This is termed the low pressure scavenging phase and the direction and magnitude of the scavenging velocity in the inlet conduit $L_c$ is so selected that the net velocity component relative to the rapidly moving cells is approximaely parallel to the cell walls. Thus in a cell arrangement as shown in Fig. 3 the resultant net velocity of the scavenging flow will also be parallel to the rotor axis, but it is understood that in some designs the cell walls would necessarily vary from the true axial alignment as illustrated. If the design is properly worked out the scavenging flow will not impinge on the cell walls but will travel through the cells in a direction parallel to the cell walls, that is the direction of flow will not be changed by the rotor. Thus the zone of contact between the scavenging air flowing in at $L_c$ and the expanded hot gasses flowing out at $L_t$ travels through the rotor with unchanged direction as long as all conditions of operation are at a steady state. This zone will be marked by the line 2—3 of Fig. 3 and will not vary in position to an appreciable extent during the operation of the pressure exchanger. As each cell passes the point 3 the velocity of the air is suddenly brought to zero and the shock effect produces a compression wave traveling back along the line 3—4. As this shock wave reaches the point 4 the cell is closed and the result is that air is trapped in the cell at increased pressure and is carried on as the cell moves toward the point 6.

Now considering the high pressure scavenging phase which commences when the cells reach point 6, it will be seen that high pressure gas flowing in conduit $H_t$ will generate a compression wave to further compress the air which was trapped in the cells. At the same time the air will be caused to move across the cell with a scavenging velocity which will be in the general range of the velocity of the gas flowing in conduit $H_t$. The zone of contact between the trapped air and the incoming high pressure gas will extend along the line 6—7 but the compression wave takes a path along the line 6—5. The air ahead of the compression wave is further compressed and behind the wave there is a velocity of gas flow which determines the velocity of flow into the outlet conduit $H_c$. As the cell reaches the point 8 the flow from the conduit $H_t$ into the cell is stopped but the zone of contact is still moving across the cell. Thus a first rarefaction wave originates at point 8 producing an expansion of air accordingly. This expansion wave flowing in the direction of line 8—7 intersects the zone of contact 6—7 at the cut-off point 7, with the result that the cell will move on containing gas at an intermediate pressure and temperature. As the cell reaches point 1 the gas starts to flow out into conduit $L_t$ where the pressure is relatively low. Thus a second expansion wave starts to propagate in the cell and produces a flow of gas at a velocity dependent on the pressure difference behind and ahead of the expansion wave. This expansion wave flows in the direction 1—2 and as the wave reaches the point 2 the cell is opened to the conduit $L_c$, permitting fresh air to flow into the cell for the low pressure scavenging phase first described.

The fundamental or basic dynamic pressure exchanger as described with relation to Figs. 2 and 3 operates by means of two compression waves and two expansion waves. The optimum pressure ratios are obtained by careful selection of scavenging velocities for the low pressure and high pressure scavenging phases and by carefully determining the geometrical correlation between the points 1 to 8 in Fig. 3. Fans in the conduits are also used in most installations to influence the scavenging velocities.

The present invention seeks to improve the action of the basic dynamic pressure exchanger by the use of a combined static and dynamic pressure exchange and by so combining these two effects a machine results which will have improved characteristics impossible of attainment by applying either of these principles alone. The pressure exchanger so constructed will achieve a higher pressure ratio and will maintain high efficiency over a wider range of variables, such as temperature and pressure conditions in the inlet and outlet conduits and rates of gas flow.

In Fig. 7 there is shown a development of the periphery or preipheral portions of a dual rotor pressure exchanger, the structure of which is shown in cross section in Fig. 4. The two rotors 20 and 21 rotate in opposite directions as indicated by the arrows A and A'. The outlet conduits $L_t$, $H_c$ and $L_t'$, $H_c'$ correspond with the conduits 34, 34' and 35, 35' of Fig. 4. The inlet passages $L_c$ and $H_t$ between the rotors correspond with conduits 32 and 33 of Fig. 4, while the static pressure passages not seen in Fig. 4 are indicated at 36 in Fig. 7. It is of course understood that the outlet conduits $L_t$ and $L_t'$ will be connected to a common header, as will also the outlet conduits $H_c$ and $H_c'$. In some power plants the outlet conduits may be connected separately to units of their own. For instance in a power plant built according to the principles of Fig. 1 the conduits $H_c$ and $H_c'$ may extend directly to separate combustion chambers and the conduits $L_t$ and $L_t'$ may extend to separate gas turbines.

To explain the operation of the dual rotor machine with combined static and dynamic pressure exchange only a single cell of rotor 20 and a single cell of rotor 21 will be considered and the cell action will be traced always in the direction of its peripheral movement (arrow A and arrow A'). Starting at left-hand end of rotor 20 the cell is filled with hot gas at a moderate pressure and on reaching conduit $L_t$ flows out under the influence of an expansion wave which is set up by the pressure difference between the air pressure in the cell and in the conduit $L_t$. As the expansion wave is under way the cell reaches the conduit $L_c$ and the air therefrom flows into the cell to start the low pressure scavenging phase. The zone of contact between the low pressure scavenging air and the outflowing warm air will be marked by the line 2—3. As the cell reaches the cut-off point 3 the low pressure compression wave is started due to the sudden closing of the cell. This will cause a compression of the air in the cell, the compression wave traveling in the direction 3—4 and reaching the end of the cell coincident with the cut-off point 4. Now air at a moderate pressure is trapped in the cell and carried on at the peripheral speed of the rotor. Now as the cell reaches the first static pressure passage or distributing passage 36 past the point 4 it is momentarily connected to a supply of high temperature air or gas at a higher pressure than the air in the cell, the supply being obtained from cells of the other rotor 21. Thus a small amount of hot gas from rotor 21 is delivered to the cell of rotor 20 further compressing the air therein. Thus compression continues in increments as other passages 36 are reached, and a gradual static pressure exchange is effected to build up the air pressure in the selected cell of rotor 20 before reaching the inlet conduit $H_t$, where the second compression wave and the high pressure scavenging phase originate.

As the selected cell of rotor 20 reaches the point 6 it is connected with the inlet conduit $H_t$ filled with high temperature gas at high pressure. This gas starts a compression shock wave in the direction 6—5, with the zone of contact between the high pressure gas and lower pressure gas extending along the line 9—7. This compression wave completes the high pressure scavenging phase and by its compressive force brings the cell contents to the final high pressure. This compressed air flows out through the conduit $H_c$ as the cell becomes substantially full of hot gases flowing in at $H_t$. This gas being at a relatively high pressure, it now flows through the successive passages 36 toward the cells of rotor 21 after the cell passes the cut-off point 7 and this action continues until the cell reaches the point 1 where the gas begins the expansion into conduit $L_t$.

Considering now the rotor 21 it will be seen that a selected cell beginning at the right-hand side of Fig. 7 is going through the low pressure scavenging phase following expansion of the gas into conduit $L_t'$. The compression wave induced by moving the cell past the cut-off point 3' compresses the fresh air flowing in from inlet conduit $L_c$ and this air or gas at increased pressure is trapped in the cell as the cell passes the cut-off or trapping point 4'. The cell is now filled with air at a moderate pressure and soon reaches the first static exchange passage 36 to the left of point 4'. The high temperature, high pressure gas from cells of rotor 20 now located between points 1 and 7 effect a gradual static pressure boost by their flow through the passages 36 in the direction of the arrows and as a result the pressure in the selected cell of rotor 21 builds up as it progresses from point 4' to point 6'. As the cell reaches the point 6' the contents thereof become subject to the full pressure in the conduit $H_t$ and a compression wave moves in the direction of line 6'—5', to further boost the pressure of the cell contents, which now flow out through conduit $H_c'$. The high temperature, high pressure air trapped in the cell as it passes point 7' will now be capable of effecting a static pressure boost in cells of rotor 20 by reason of the pressure distribution passages 36. At the same time there is little loss of pressure in the cell before it reaches the outlet conduit $L_t'$ where the gas can expand and flow into the conduit $L_t'$. After and during expansion the low pressure scavenging phase takes place under the action of the fresh air flowing in at $L_c$.

In a pressure exchanger operating in the manner above outlined it will be possible to achieve greater pressure ratios and a more efficient power plant can thus be built, and such a plant will be less affected by load variations and other transient changes. As should be clear from the description of the pressure interchange through the distributing passages 36, each rotor acts on the other in a unique and highly satisfactory manner. As the high pressure compressive waves begin in the cells of rotors 20 and 21 at the points 6 and 6', the cell pressure is already built up by static pressure exchange and the pressure in the conduits $H_c$ and $H_c'$ will be higher than would be the case otherwise.

As indicated above the dual rotor pressure exchanger may be used in a power plant as shown in Fig. 1 or in any similar power cycle. As will be appreciated, the increased pressure boost from $L_c$ to $H_c$ will give a better output from the combustion chamber thus furnishing more power at the secondary turbine and greater pressure at the pressure exchanger inlet conduit $H_t$. Thus the power plant efficiency will increase very decidedly and the pressure exchanger itself will be less sensitive to variable factors. This flexibility should be especially advantageous in locomotive power plants where there may be variations in load, barometric pressure and air temperature. The same would apply also in ship, aircraft and stationary power plants. The increasing use of gas turbine power plants make it desirable to improve any adjuncts or auxiliaries used in association therewith.

The dual rotor pressure exchanger with combined static and dynamic pressure exchange may take other forms than that described above. For example one rotor may run inside the other as illustrated in Fig. 8. Considering the structure of Fig. 8 in detail it will be noted that the inner rotor 40 is carried on a central shaft 40' while the outer rotor 41 is mounted to turn on an axial extension 42 of the inner rotor 40. The shaft 40' is rotatably mounted in a bearing 43 at one end and is connected to a motor 44 at the other end. The inner rotor 40 includes an axial extension 42' which is non-rotatably secured to shaft 40' by means of a crosspin 43'. Surrounding the two rotors is drum-like casing or housing 45 having a cylindrical inner wall 46 extending between the outer periphery of the rotor 40 and the inner periphery of the rotor 41. This wall 46 is provided with static pressure exchange openings 47, corresponding in function with the passages 36 of Fig. 7. These exchange ports or openings 47 may extend over the whole periphery of the machine or may cover only certain portions or segments of the periphery as will be better described below in connection with Fig. 9. The inner rotor 40 runs at the same speed as the motor 44 and in the same direction, while the outer rotor 41 is made to operate at the same speed as the motor but in the opposite direction. This is accomplished by the use of a bevel gear 48 on the rotor extension 42 which drives the intermediate bevel gears 49. The gears 49 in turn mesh with a bevel gear 50 fixed to the axial extension 51 of the rotor 41. The opposite bevel gears 49 are provided with stub shafts mounted to turn freely in the fixed bearing 49'.

Connected at the left-hand side of casing 45 are the gas inlet conduits 52 and 53 and at the right-hand side of the casing are gas outlet conduits 54 and 55. These conduits correspond to those designated $H_t$, $L_c$, $H_c$ and $L_t$ respectively in Fig. 7. The inner rotor 40 carries cell partitions on its outer periphery like the rotor illustrated in Fig. 6. The rotor 41 is built similar but is hollow to receive the counter-rotating rotor 40. The radially extending wall of the rotor 41 is provided with successive openings 56 all the way around its periphery to allow passage of gas from the cells of rotor 40 out through the conduits 54 and 55. Also the axially extending wall of the rotor 41 is provided with successive openings 57 which allow the static pressure exchange through the openings 47 described above.

The operation of the pressure exchanger made according to Fig. 8 is similar to that of Fig. 4 except for the static pressure exchange which follows a short and direct route through ports 47 and 57. Fig. 9 shows a functional diagram similar to Fig. 7 so that the operation may be visualized by showing a development plan of the two rotors, one above the other. As indicated by the arrows B and B' the two rotors rotate in opposite directions. The compression and expansion wave flow is exactly the same as in Fig. 7, except that the gradual static pressure exchange instead of being obtained by a flow through the conduits or passages 36 in Fig. 7 is now accomplished by a radial flow through the ports 47 and 57 in the dividing wall 46 and in the cylindrical wall portion of rotor 41, respectively. The ports 57 may extend clear around the rotor wall with just enough wall material between each port to hold the structure rigidly together, but the ports 47 in the dividing wall may have an extent as indicated in Fig. 9. Instead of each port 47 being continuous over a substantial section of the periphery, as indicated in Fig. 9, these ports may be divided up into a group of separate passages similar to the spaced passages 36 of Fig. 7. As will be observed, the development plan view of Fig. 9 covers more than one complete revolution of the rotors just as in Fig. 7. As will be appreciated by comparing Figs. 7 and 9, the static pressure exchange is always from a group of cells at high pressure, or in compression, to a group of cells at low pressure, or in expansion. This will mean that flow through one port 47 will be in a direction opposite to flow through the adjacent port 47. The result is the partial compression areas bounded on one side by the lines 4, 9 and 2', 9'. Thus in Fig. 9 flow through the left-hand port 47 will be from the lower rotor moving in direction B' to the upper rotor moving in direction B. Flow through the right-hand port 47 will be from the upper rotor moving in direction B to the lower rotor moving in direction B'. While there will only be two ports 47 in the apparatus of Fig. 8 and Fig. 9, they are shown superimposed on both rotors in the diagrammatic plan in order to show the relative position with respect to each rotor and with respect to the gas inlet and outlet passages. The arrangement of rotors as shown in Fig. 8 offers the advantage of providing the shortest possible static pressure exchange conduits and thus minimizes pressure and heat loss, as well as affording a more compact machine.

In Fig. 10 there is illustrated a portion of a two-rotor pressure exchanger similar in principle to that of Fig. 8. The section shown is between the gas inlet passages 52 and 53 and shows an alternative arrangement of the static pressure exchange passages. The rotor casing is made up of end walls 60 and 61 and outer cylindrical wall 62. Mounted to rotate therein are the rotors 63 and 64 having the usual cells on their outer periphery. The axially extending wall 65 of the rotor 64 is not ported as in Fig. 8, but instead the end wall 60 is provided with channel 66 to form a pressure exchange passage 67 corresponding in relative peripheral position and operating effect to the port 47 of Fig. 8. This arrangement provides for purely axial flow of the exchange pressure and avoids cross currents which will tend to mix two working gases at different temperatures. For this reason the modified arrangement of static pressure exchange ports may prove more practical than the construction shown in Fig. 8.

As will be understood from the foregoing description the two rotors can be arranged in several ways and may even be completely independent as far as their housings and bearing supports are concerned. However in all cases the inlet and outlet conduits must be arranged to achieve dynamic pressure exchange and the static pressure exchange passages must be provided to achieve a gradual static pressure exchange, in order to increase the efficiency of the machine over that of previously known pressure exchangers.

Figure 12:
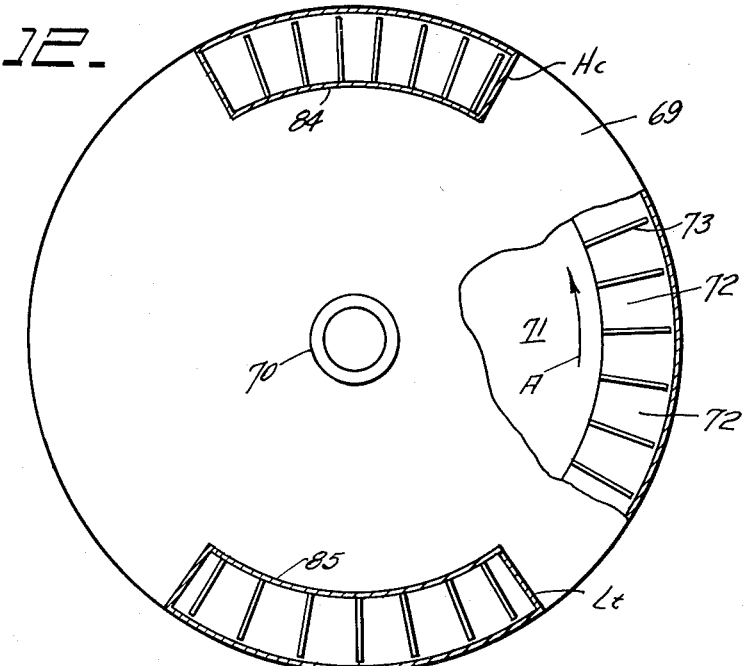
Fig. 12 is a view of the other end of the single rotor pressure exchanger of Fig. 11, wherein a portion of the casing is cut away to show part of the rotor therein.

The main purpose of the present invention is to obtain static and dynamic pressure exchange. While the preferred form of the invention employs two rotors operating in opposite directions of rotation, it is possible to achieve the desired results by the use of a single rotor. Such a single rotor pressure exchanger is shown in Figs. 11 and 12. The general arrangement of the rotor and housing is like the basic pressure exchanger of Figs. 2 and 3. Figs. 11 and 12 show the improved single rotor pressure exchanger as seen from opposite ends. The cylindrical casing will thus be closed at its ends by circular end plates 68 and 69, and the end plates will each be provided with rotor shaft bearings 70. The rotor 71 mounted within the casing or housing is provided with peripheral cells 72 formed by providing radial partitions 73 on the outer rim of the rotor. The end plate 68 is provided with gas inlet conduit 74 corresponding to conduit $H_t$ of Figs. 2 and 3, and also with gas inlet conduit 75 corresponding to conduit $L_c$ of Figs. 2 and 3. Between these gas inlets there are arranged static pressure exchange conduits 76, 77, 78, 79 and 80 through which static pressure exchange occurs in the direction of the arrows adjacent to the conduits. The other end plate 69 is provided with gas outlet conduit 84 corresponding to conduit $H_c$ of Figs. 2 and 3, and also with gas outlet conduit 85 corresponding to conduit $L_t$ of Figs. 2 and 3. The direction of rotation of the rotor 71 should be in the direction of counter-clockwise arrow A in Fig. 12. However the side of the rotor facing outward in Fig. 11 will be turning in a clockwise direction. Looking at Fig. 11 the cells 72 will be moving from the conduit $H_t$ toward conduit $L_c$ as they pass the inlet ends of static pressure exchange conduits 76 to 80 inclusive. The pressure exchange obtained will correspond to that depicted in Fig. 7, since referring to the latter view it will be seen that the rotor cells which are moving from inlet conduit $H_t$ toward inlet conduit $L_c$ are connected to the inlet end of conduits 36, while the cells which are moving from inlet conduit $L_c$ to the inlet conduit $H_t$ are connected to the outlet end of conduits 36. In the same way in Fig. 11 the cells 72 moving from conduit $H_t$ toward $L_c$ are connected to the inlet ends of static pressure exchange conduits 76 to 80, while the outlet ends of the exchange conduits at the left of Fig. 11 will be connected to other cells of the same rotor moving from conduit $L_c$ toward conduit $H_t$. Thus the analogy between the two-rotor exchanger and the single rotor exchanger is perfectly clear, although the relatively long static pressure exchange conduits 76 to 80 present one disadvantage in the single rotor machine. For smaller power plants however the single rotor exchanger will have a distinct advantage over the two-rotor exchanger.

As now understood the previously known pressure exchanger operate either on the principle of a simple static pressure exchange or a gradual static pressure exchange or a dynamic pressure exchange. The present invention combines a gradual static pressure exchange with a dynamic pressure exchange, thus producing results which can not be obtained by the use of either effect alone. The simple static pressure exchanger has the disadvantage that the scavenging velocities must be kept low in order to avoid excessive losses. The capacity of these machines is therefore limited by the low velocities. The dynamic pressure exchanger on the other hand can in principle apply much higher scavenging velocities but has other disadvantages. The basic dynamic pressure exchanger as shown in Figs. 2 and 3 operates by means of two compression and two expansion waves. The relations between the scavenging velocities and the pressure ratios for each of these waves may be determined by an equation for dynamic relation of the gas flow.

The four resulting gas-dynamic conditions work together in the operation of the machine and must be satisfied in addition to static pressure and energy conditions. This means that there are limiting conditions influencing design and operation, which conditions determine the feasible pressure ratios, the efficiency and also the machine capacity.

The present invention avoids the disadvantages of the previously known pressure exchangers to a large extent. By a combined static pressure and dynamic pressure exchange the total pressure ratio can be made within certain limits independent of the scavenging velocities. The total achievable pressure ratio of the new machine using the present principles of invention is composed of a static and a dynamic component:

$$R_{total} = P_h/P_1 = R_{static} \times R_{dynamic}$$

The dynamic component in this equation depends of course on the scavenging velocities but the relations concerned are simpler and clearer because the four conditions in the exchanger corresponding to the four waves are now more or less isolated. The static pressure component $R_{static}$ is nearly independent of the scavenging velocities and depends mainly on the ratio of the weight flow through the turbine and compressor cycles and on the temperature conditions. The static pressure ratio can be made even smaller than unit, which means that in the middle stages of static pressure exchange the pressure of the fresh air is actually higher than that of the hot combustion gases. With such a condition the equalizing flow in the exchange conduits would have therefore the opposite direction than that shown in the drawings and these conduits would be filled with fresh air instead of hot combustion gases. This shows the extreme flexibility of operation of the present apparatus when conditions are changing. However it should be understood that under average working conditions the static pressure ratio will be greater than unity and the static pressure exchange flow will be in the directions specifically marked on the drawings or explained above.

The embodiments of the invention herein shown and described are to be regarded as illustrative only and it is to be understood that the invention is susceptible of variations, modifications and changes within the scope of the appended claims.

I claim:

1. A pressure exchanger comprising two multi-cell rotors each of which carries a plurality of similar cells on its periphery extending from one side to the other of the rotor with each cell being separated from adjacent cells by radially extending walls, means to enclose said rotors, means to rotate said rotors on their central axes in reverse relation, means providing a first gas inlet channel at one side of said rotors for supplying gas at low pressure to the rotor cells, means providing a second gas inlet channel at said one side of said rotors and circumferentially spaced from said first gas inlet channel for supplying gas at a high rate pressure to the rotor cells, means providing a first and a second gas outlet channel at the other side of said rotors for delivering from said cells the low pressure gas having its pressure increased to the value of the high pressure gas and for delivering from said cells the high pressure gas having its pressure reduced to the inlet pressure of the low pressure gas, said inlet and outlet channels being positioned circumferentially so that the low pressure outlet is reached by the rotor cells before the low pressure inlet and the low pressure outlet is passed by the rotor cells before the low pressure inlet and wherein the time intervals involved are determined by the time required for an expansion wave and a compression wave respectively to traverse said cells, and so that the high pressure inlet is reached by the rotor cells before the high pressure outlet and the high pressure inlet is passed by the rotor cells before the high pressure outlet and wherein the time intervals involved are determined by the time required for a compression wave and an expansion wave respectively to traverse said cells, and means providing static pressure exchange passages between the cells of the respective rotors to connect cells of one rotor moving from high pressure inlet closing toward low pressure inlet opening with cells of the other rotor moving from low pressure inlet closing toward high pressure inlet opening and which also connect cells of said one rotor moving from low pressure outlet closing toward high pressure outlet opening with cells of the other rotor moving from high pressure inlet closing toward low pressure inlet opening, the ends of said static pressure exchange passages connecting with said cells at the axial ends thereof and having a radial extent at the ends equal to the radial extent of said cells, whereby the pressure in connected cells is gradually equalized and some expanding gas is delivered from cells at high pressure to cells at low pressure.

2. A pressure exchanger comprising two multi-cell rotors each of which carries a plurality of similar cells on its periphery extending from one side to the other of the rotor, means to enclose said rotors, means mounting said rotors for rotation on their central axes in adjacent coaxial relation, means to rotate said rotors in reverse relation, means providing a first gas inlet channel at the adjacent sides of said rotors for supplying gas at low pressure to the rotor cells, means providing a second gas inlet channel at the adjacent sides of said rotors and circumferentially spaced from said first gas inlet channel for supplying gas at a high pressure to the rotor cells, means providing a first and a second gas outlet channel at the remote sides of said rotors for delivering from said cells the low pressure gas having its pressure increased to the value of the high pressure gas and for delivering from said cells the high pressure gas having its pressure reduced to the inlet pressure of the low pressure gas, said inlet and outlet channels being positioned circumferentially so that the low pressure outlet is reached by the rotor cells before the low pressure inlet and the low pressure outlet is passed by the rotor cells before the low pressure inlet and wherein the time intervals involved are determined by the time required for an expansion wave and a compression wave respectively to traverse said cells, and so that the high pressure inlet is reached by the rotor cells before the high pressure outlet and the high pressure inlet is passed by the rotor cells before the high pressure outlet and wherein the time intervals involved are determined by the time required for a compression wave and an expansion wave respectively to traverse said cells, and means providing static pressure exchange passages between the adjacent sides of the rotors to connect cells of one rotor moving from high pressure inlet closing toward low pressure inlet opening with cells of the other rotor moving from low pressure inlet closing toward high pressure inlet opening and which also connect cells of said one rotor moving from low pressure outlet closing toward high pressure outlet opening with cells of the other rotor moving from high pressure inlet closing toward low pressure inlet opening, whereby the pressure in connected cells is gradually equalized and some expanding gas is delivered from cells at high pressure to cells at low pressure.

3. A pressure exchanger comprising two multi-cell rotors each of which carries a plurality of similar cells on its periphery extending from one side to the other of the rotor, one of said rotors being made hollow to receive the other and smaller rotor in enclosing relation therein, means providing a housing around said rotors, means mounting said rotors for independent rotation on their central axes, means to rotate said rotors in reverse relation, means providing a first gas inlet channel at the corresponding sides of said rotors for supplying gas at low pressure to the rotor cells, means providing a second gas inlet channel at said corresponding sides of said rotors and circumferentially spaced from said first gas inlet channel for supplying gas at a high pressure to the rotor cells, means providing a first and a second gas outlet channel at the other corresponding sides of said rotors for delivering from said cells the low pressure gas having its pressure increased to the value of the high pressure gas and for delivering from said cells the high pressure gas having its pressure reduced to the inlet pressure of the low pressure gas, said inlet and outlet channels being positioned circumferentially so that the low pressure outlet is reached by the rotor cells before the low pressure inlet and the low pressure outlet is passed by the rotor cells before the low pressure inlet and wherein the time intervals involved are determined by the time required for an expansion wave and a compression wave respectively to traverse said cells, and so that the high pressure inlet is reached by the rotor cells before the high pressure outlet and the high pressure inlet is passed by the rotor cells before the high pressure outlet and wherein the time intervals involved are determined by the time required for a compression wave and an expansion wave respectively to traverse said cells, and means providing static pressure exchange passages between said corresponding sides of said rotors to connect cells of one rotor moving from high pressure inlet closing toward low pressure inlet opening with cells of the other rotor moving from low pressure inlet closing toward high pressure inlet opening and which also connect cells of said one rotor moving from low pressure outlet closing toward high pressure outlet opening with cells of the other rotor moving from high pressure inlet closing toward low pressure inlet opening, whereby the pressure in connected cells is gradually equalized and some expanding gas is delivered from cells at high pressure to cells at low pressure.

4. A pressure exchanger as defined in claim 3 wherein said means to rotate said rotors in reverse relation comprises an axial extension on each rotor with one extension extending inside the other, a bevel gear wheel on the outer end of each extension with the beveled sides of the respective wheels facing each other, bevel gears between said wheels and in constant mesh therewith, and a motor directly connected to one of said extensions.

References Cited in the file of this patent

UNITED STATES PATENTS

| | | |
|---|---|---|
| 2,045,152 | Lebre | June 23, 1936 |
| 2,399,394 | Seippel | Apr. 30, 1946 |